US007159656B2

(12) United States Patent
Eoff et al.

(10) Patent No.: US 7,159,656 B2
(45) Date of Patent: Jan. 9, 2007

(54) METHODS OF REDUCING THE PERMEABILITIES OF HORIZONTAL WELL BORE SECTIONS

(75) Inventors: Larry S. Eoff, Duncan, OK (US); B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 209 days.

(21) Appl. No.: 10/780,995

(22) Filed: Feb. 18, 2004

(65) Prior Publication Data

US 2005/0178549 A1    Aug. 18, 2005

(51) Int. Cl.
*E21B 33/138* (2006.01)
*E21B 43/00* (2006.01)

(52) U.S. Cl. .............. 166/295; 166/294; 166/300; 507/224; 507/225; 507/226; 507/229; 507/277

(58) Field of Classification Search ............ 166/270, 166/294, 295, 50, 300; 507/224, 225, 226, 507/229, 277
See application file for complete search history.

(56) References Cited

U.S. PATENT DOCUMENTS

| 2,863,832 | A | 12/1958 | Perrine ................. 252/8.55 |
| 2,910,436 | A | 10/1959 | Fatt et al. .............. 252/8.55 |
| 3,215,199 | A | 11/1965 | Dilgren ..................... 166/38 |
| 3,251,415 | A | 5/1966 | Bombardier et al. ........ 166/42 |
| 3,297,090 | A | 1/1967 | Dilgren ..................... 166/38 |
| 3,307,630 | A | 3/1967 | Dilgren et al. ............. 166/38 |
| 3,382,924 | A | 5/1968 | Veley et al. ............... 166/42 |
| 3,434,971 | A | 3/1969 | Atkins ................... 252/8.55 |
| 3,441,085 | A | 4/1969 | Gidley ..................... 166/307 |
| 3,451,818 | A | 6/1969 | Wareham ..................... 96/78 |
| 3,744,566 | A | 7/1973 | Szabo et al. .............. 166/275 |
| 3,910,862 | A | 10/1975 | Barabas et al. ...... 260/79.3 MU |
| 4,129,183 | A | 12/1978 | Kalfoglou ................. 166/300 |
| 4,142,595 | A | 3/1979 | Anderson et al. |
| 4,158,521 | A | 6/1979 | Anderson et al. .......... 405/264 |
| 4,158,726 | A | 6/1979 | Kamada et al. ............ 526/200 |
| 4,299,710 | A | 11/1981 | Dupre et al. ............. 252/8.5 A |
| 4,366,071 | A | 12/1982 | McLaughlin et al. ... 252/8.55 R |
| 4,366,072 | A | 12/1982 | McLaughlin et al. ... 252/8.55 R |
| 4,366,073 | A | 12/1982 | McLaughlin et al. ... 252/8.55 R |
| 4,366,074 | A | 12/1982 | McLaughlin et al. ... 252/8.55 R |
| 4,374,739 | A | 2/1983 | McLaughlin et al. ... 252/8.55 R |
| 4,393,939 | A | 7/1983 | Smith et al. ............. 166/293 |
| 4,395,340 | A | 7/1983 | McLaughlin ........... 252/8.55 D |
| 4,401,789 | A | 8/1983 | Gideon .................... 524/827 |
| 4,439,334 | A | 3/1984 | Borchardt .............. 252/8.55 D |
| 4,440,649 | A | 4/1984 | Loftin et al. ............ 252/8.5 C |
| 4,447,342 | A | 5/1984 | Borchardt et al. ...... 252/8.55 D |
| 4,460,627 | A | 7/1984 | Weaver et al. ............ 427/212 |
| 4,462,718 | A | 7/1984 | McLaughlin et al. ....... 405/264 |
| 4,532,052 | A | 6/1985 | Weaver et al. ......... 252/8.55 R |
| 4,536,297 | A | 8/1985 | Loftin et al. ............ 252/8.5 C |
| 4,536,303 | A | 8/1985 | Borchardt .............. 252/8.55 R |
| 4,536,305 | A | 8/1985 | Borchardt et al. ...... 252/8.55 R |
| 4,554,081 | A | 11/1985 | Borchardt et al. ....... 252/8.5 A |
| 4,563,292 | A | 1/1986 | Borchardt .............. 252/8.55 R |
| 4,604,216 | A | 8/1986 | Irvin et al. ................ 252/8.51 |
| 4,627,926 | A | 12/1986 | Peiffer et al. .......... 252/8.55 R |
| 4,671,883 | A | 6/1987 | Connell .................. 252/8.515 |
| 4,693,639 | A | 9/1987 | Hollenbeak et al. ........ 405/263 |
| 4,699,722 | A | 10/1987 | Dymond et al. ......... 252/8.551 |
| 4,708,974 | A * | 11/1987 | Chang et al. ............... 523/130 |
| 4,730,028 | A | 3/1988 | Bock et al. ................ 526/225 |
| 4,814,096 | A | 3/1989 | Evani |
| 4,828,726 | A | 5/1989 | Himes et al. ............ 252/8.553 |
| 4,959,432 | A | 9/1990 | Fan et al. ................... 526/287 |
| 5,071,934 | A | 12/1991 | Peiffer ....................... 526/307 |
| 5,097,904 | A | 3/1992 | Himes ........................ 166/294 |
| 5,146,986 | A | 9/1992 | Dalrymple .................. 166/294 |
| 5,160,642 | A | 11/1992 | Schield et al. .......... 252/8.551 |
| 5,197,544 | A | 3/1993 | Himes ........................ 166/294 |
| 5,208,216 | A | 5/1993 | Williamson et al. ........ 507/120 |
| 5,244,042 | A | 9/1993 | Dovan et al. ............... 166/270 |
| 5,271,466 | A | 12/1993 | Harms ........................ 166/300 |
| 5,342,530 | A | 8/1994 | Aften et al. ............. 252/8.551 |
| 5,379,841 | A | 1/1995 | Pusch et al. ................ 166/295 |
| 5,382,371 | A | 1/1995 | Stahl et al. ................ 507/221 |
| 5,597,783 | A | 1/1997 | Audibert et al. ........... 507/120 |
| 5,607,902 | A | 3/1997 | Smith et al. ............... 507/120 |
| 5,626,191 | A * | 5/1997 | Greaves et al. ............ 166/245 |

(Continued)

FOREIGN PATENT DOCUMENTS

DE        2 250 552        4/1974

(Continued)

OTHER PUBLICATIONS

Paper entitled "Controlling Formation Damage Using Clay Stabilizers: A Review", by Z. J. Zhou et al., dated 1995.

(Continued)

*Primary Examiner*—George Suchfield
(74) *Attorney, Agent, or Firm*—Robert A. Kent; Crustsinger & Booth

(57) ABSTRACT

Methods of temporarily reducing the permeability of one or more selected sections of a subterranean formation penetrated by a horizontal well bore and the flow of water or water and hydrocarbons or hydrocarbons therefrom are provided. The methods comprise the steps of preparing or providing an aqueous treating fluid comprising water and a water-soluble formation permeability reducing agent, introducing the aqueous treating fluid into one or more selected sections and when required, contacting the one or more selected sections with an aqueous treating fluid comprising water and a formation permeability restoring chemical.

19 Claims, No Drawings

U.S. PATENT DOCUMENTS

| | | | |
|---|---|---|---|
| 5,637,556 A | 6/1997 | Argillier et al. | 507/120 |
| 5,646,093 A | 7/1997 | Dino | |
| 5,669,456 A | 9/1997 | Audibert et al. | 175/72 |
| 5,720,347 A | 2/1998 | Audibert et al. | 166/294 |
| 5,728,653 A | 3/1998 | Audibert et al. | |
| 5,735,349 A | 4/1998 | Dawson et al. | 166/295 |
| 5,887,653 A | 3/1999 | Bishop et al. | 166/281 |
| 5,944,106 A | 8/1999 | Dalrymple et al. | 166/281 |
| 5,972,848 A | 10/1999 | Audibert et al. | 507/119 |
| 5,979,557 A | 11/1999 | Card et al. | 166/300 |
| 6,020,289 A | 2/2000 | Dymond | |
| 6,070,664 A | 6/2000 | Dalrymple et al. | 166/281 |
| 6,124,245 A | 9/2000 | Patel | 507/120 |
| 6,187,839 B1 | 2/2001 | Eoff et al. | 523/130 |
| 6,228,812 B1 | 5/2001 | Dawson et al. | 507/221 |
| 6,237,687 B1 | 5/2001 | Barbee, Jr. et al. | 166/278 |
| 6,253,851 B1 | 7/2001 | Schroeder, Jr. et al. | 166/278 |
| 6,277,900 B1 | 8/2001 | Oswald et al. | 523/130 |
| 6,283,210 B1 | 9/2001 | Soliman et al. | 166/270 |
| 6,359,047 B1 | 3/2002 | Thieu et al. | 524/376 |
| 6,364,016 B1 | 4/2002 | Dalrymple et al. | 166/270 |
| 6,380,137 B1 * | 4/2002 | Heier et al. | 507/121 |
| 6,476,169 B1 | 11/2002 | Eoff et al. | 526/307.2 |
| 6,476,283 B1 | 11/2002 | Devore et al. | 585/250 |
| 6,497,283 B1 | 12/2002 | Eoff et al. | 166/293 |
| 6,516,885 B1 | 2/2003 | Munday | 166/295 |
| 6,562,762 B1 * | 5/2003 | Cowan et al. | 507/110 |
| 6,569,983 B1 | 5/2003 | Treybig et al. | 528/102 |
| 6,609,578 B1 | 8/2003 | Patel et al. | 175/64 |
| 6,710,107 B1 | 3/2004 | Audibert et al. | 524/5 |
| 6,787,506 B1 | 9/2004 | Blair et al. | 507/222 |
| 6,803,348 B1 | 10/2004 | Jones et al. | |
| 2003/0019627 A1 | 1/2003 | Qu et al. | 166/281 |
| 2003/0191030 A1 | 10/2003 | Blair et al. | 507/225 |
| 2004/0102331 A1 | 5/2004 | Chan et al. | 507/100 |
| 2004/0220058 A1 | 11/2004 | Eoff et al. | 507/200 |
| 2005/0230116 A1 | 10/2005 | Eoff et al. | |

FOREIGN PATENT DOCUMENTS

| | | |
|---|---|---|
| EP | 0 383 337 A2 | 8/1990 |
| EP | 0 896 122 A2 | 2/1999 |
| EP | 1033378 | 2/2000 |
| EP | 1 033 378 A1 | 9/2000 |
| EP | 1 193 365 A1 | 4/2002 |
| EP | 1 312 753 A1 | 5/2003 |
| GB | 2 221 940 A | 2/1990 |
| GB | 2335428 A | 9/1999 |
| WO | WO 93/15164 | 8/1993 |
| WO | WO 99/49183 | 9/1999 |
| WO | WO 99/50530 | 10/1999 |
| WO | WO 2000/78890 | 12/2000 |
| WO | WO 02/097236 | 12/2002 |
| WO | WO 2003/056130 | 7/2003 |
| WO | WO 04/101706 A1 | 11/2004 |
| WO | WO 2004/094781 | 11/2004 |

OTHER PUBLICATIONS

U.S. Appl. No. 10/236,722, filed Sep. 6, 2002, Eoff et al.
U.S. Appl. No. 10/375,787, filed Feb. 27, 2003, Eoff et al.
U.S. Appl. No. 10/440,337, filed May 16, 2003, Eoff et al.
U.S. Appl. No. 10/612,271, filed Jul. 2, 2003, Eoff et al.
Patent Application No. 2003-IP-009464 entitled "Methods and Compositions for the Diversion of Aqueous Injection Fluids in Injection Operations".
Patent Application No. 2001-IP-005267U1P1 entitled "Methods and Compositions for Reducing the Production of Water and Stimulating Hydrocarbon Production from a Subterranean Formation" and which is a continuation-in-part of U.S. Appl. No. 10/440,337.
Inikori, Solomon Ovueferaye, "Numerical Study of Water Coning Control with Downhole Water Sink (DWS) Well Completions in Verticle and Horizontal Wells," A Dissertation, Aug. 2002, title page, contents, abstract and pp. 17-18, The Department of Petroleum Engineering.
Halliburton, 2001 Press Release, "First Halliburton H2Zero™ Conformance Solution Job Performed for a Producing Well in Egypt," www.haliburton.com/news/archives/2001esgnws_111901.jsp, Nov. 19, 2001, 2 pp.
Halliburton, 2001 Press Release, "Halliburton Performs First H2Zero™ Conformance Solution Job in North America," www.haliburton.com/news/archives/2001esgnws_082201.jsp, Aug. 22, 2001, 2 pp.
Halliburton, 2001 Press Release, "Halliburton Technology Uses Revolutionary Polymer System to Control Unwanted Water production," www.haliburton.com/news/archives/2001esgnws_053101.jsp, May 31, 2001, 2 pp.
BJ Services Company, Aquacon, Aug. 1, 2001, 2pp.
BJ Services Company, Aquatrol 1, Dec. 14, 2000, 2 pp.
Eoff, Larry et al., "Structure and Process Optimization for the Use of a Polymeric Relative-Permeability Modifier in Conformance Control," SPE eLibrary paper No. 64985, 2001 Copyright, 2 pp.
Botermans, C. Wouter et al. "Relative Permeabiity Modifiers: Myth or Reality?," SPE eLibrary paper No. 68973, 2001 copyright, 2pp.
BJ Services Company, Aquacon, Aug. 1, 2001, 2 pp.
Botermans, C. Wouter, et al, *Relative Permeability Modifiers: Myth or Reality?*, SPE No. 68973, 2001, Society of Petroleum Engineers, Inc., presented at SPE European Formation Damage Conference, The Hague, The Netherlands, May 21-22, pp. 1-13 (previously listed as website address, SPE eLibrary).
Eoff, Larry, et al, *Structure and Process Optimization for the Use of a Polymeric Relative-Permeability Modifier in Conformance Control*, SPE No. 64985, 2001, Society of Petroleum Engineers, Inc., presented at SPE International Symposium on Oilfield Chemistry, Houston, TX, Feb. 13-26, pp. 1-14 (previously listed as a website address, SPE eLibrary).
Xu, et al.., Modeling of Laser Spallation Drilling of Rocks for Gas-and Oilwell Drilling, SPE 95746, 2005.
Gahan, et al., Effect of Downhole Pressure Conditions on High-Power Laser Perforation, SPE 97093, 2005.
Gahan, et al., Analysis of Efficient High-Power Fiber Lasers of Well Perforation, SPE 90661, 2004.
Parker, et al., Well Perforation Using High-Power Lasers, SPE 84418, 2003.
Parker, et al., Laser Drilling: Effects of Beam Application Methods on Improving Rock Removal, SPE 84353, 2003.
Bai, et al., Improved Determination of Stree-Dependent Permeability for Anisotropic Formations, SPE 78188, 2002.
Proett, et al., Advanced Permeability and Anisotropy Measurements While Testing and Sampling in Real-Time Using a Dual Probe Formation Tester, SPE 62919, 2000.
Proett, et al., Advanced Dual Probe Formation Tester with Transient, Harmonic, and Pulsed Time-Delay Testing Methods Determines Permeability, Skin and Anisotropy, SPE 64650, 2000.
U.S. Appl. No. 10/763,800, filed Jan. 24, 2004, Eoff et al.
U.S. Appl. No. 10/780,995, filed Feb. 18, 2004, Eoff et al.
U.S. Appl. No. 10/806,894, filed Mar. 23, 2004, Eoff et al.
U.S. Appl. No. 10/825,001, filed Apr. 15, 2004, Eoff et al.
U.S. Appl. No. 10/872,997, filed Jun. 21, 2004, Eoff et al.
U.S. Appl. No. 10/881,198, filed Jun. 29, 2004, Dairymple et al.
U.S. Appl. No. 10/893,210, filed Jul. 16, 2004, Eoff et al.
U.S. Appl. No. 11/102,062, filed Apr. 8, 2005, Sierra et al.

* cited by examiner

METHODS OF REDUCING THE PERMEABILITIES OF HORIZONTAL WELL BORE SECTIONS

BACKGROUND OF THE INVENTION

1. Field of the Invention

The present invention relates to methods of temporarily reducing the permeability of one or more selected sections of a subterranean formation penetrated by a horizontal well bore and when required, restoring the permeability of the selected sections.

2. Description of the Prior Art

The drilling of horizontal well bores from existing well bores has improved the production capacity of the wells. In addition, the drilling of horizontal well bores from existing well bores brings about lower drilling costs, reduced capital expense and higher percent recovery of oil and gas.

In order to control the production rates from different segments of horizontal wells or from different horizontal well bores, sophisticated completion hardware has heretofore been installed such as horizontal well bore flow control apparatus, sensors, data transmission devices, wireless remote control apparatus, pressure monitoring devices and the like. While the installation of such hardware for production rate control has definite advantages in deep off-shore wells where the use of conventional techniques are very expensive, more economical means of production rate control are needed in on-shore wells and other shallow wells that include horizontal well bores. A problem that often occurs in the production of hydrocarbons from horizontal well bores in producing zones is that the portion of the subterranean formation penetrated by the heel of the horizontal well bore often experiences higher draw-down pressure than the other portions of the well bore including the toe. The term "heel" refers to the portion of the horizontal well bore where the well bore begins its curvature to horizontal and the term "toe" refers to the end portion of the horizontal well bore. As a result of the higher draw-down pressure in the heel portion, higher production rates result from the heel portion than from the other portions of the well bore when the entire horizontal well bore is produced. This leads to higher hydrocarbon production rates from the heel portion which in turn may lead to early water break-through. Consequently, the full production potential of the other portions of the horizontal well bore in the producing zone may never be realized.

Other problems that are often encountered in subterranean producing zones penetrated by horizontal well bores include the inability to control production from sections of varied permeability in the subterranean zone, the inability to eliminate cross-flows in the horizontal well bore and the inability to achieve zonal isolation in the well bore.

Thus, there are needs for improved methods utilizing chemical processes for reducing the permeabilities of selected sections of horizontal well bores or of the entire lengths of the well bores and for restoring the permeabilities when desired.

SUMMARY OF THE INVENTION

The present invention provides improved methods of reducing the permeabilities of horizontal well bore sections and restoring the permeabilities thereof when required which meet the needs described above and overcome the deficiencies of the prior art.

The improved methods of this invention for temporarily reducing the permeabilities of one or more selected sections of a subterranean formation penetrated by a horizontal well bore and the flow of water or water and hydrocarbons or hydrocarbons therefrom comprises the following steps. An aqueous treating fluid comprising water and a water-soluble formation permeability reducing agent selected from the group consisting of a hydrophobically modified water-soluble polymer, a hydrophilically modified water-soluble polymer and a hydrophobically modified water-soluble polymer comprising polar heteroatoms within the polymer backbone is prepared or provided. The aqueous treating fluid containing a water-soluble formation permeability reducing agent is introduced into the one or more selected sections so that the permeabilities and flows of water or water and hydrocarbons or hydrocarbons therefrom are reduced. When required thereafter, the one or more selected sections can be restored by contacting the sections with an aqueous treating fluid comprising water and a formation permeability restoring chemical.

The objects, features and advantages of the present invention will be readily apparent to those skilled in the art upon a reading of the description of preferred embodiments which follows.

DESCRIPTION OF PREFERRED EMBODIMENTS

The present invention provides methods of temporarily reducing the permeability of one or more selected sections of a subterranean formation penetrated by a horizontal well bore and thereby reducing the flow of water or water and hydrocarbons therefrom.

The term "water" when used in reference to the water produced with hydrocarbons from subterranean formations includes salt water and brines.

Horizontal well bores penetrating subterranean formations increase the well bore penetration in the hydrocarbon bearing formations and increase the production of hydrocarbons therefrom. A problem that is often encountered in formations including one or more horizontal well bores is that the section of the well bore closest to the heel of the well bore often experiences higher draw-down pressure than the sections of the well bore closest to the toe of the well bore. This situation leads to higher production rates from the heel portion of the well bore than in other sections of the well bore which may lead to early water break through in the heel section. This in turn can result in less than the fill production potential of the toe section being realized. Thus, in subterranean formations containing horizontal well bores, problems are often encountered due to the inability to control the production from sections of varied permeability in the subterranean zone, the inability to eliminate cross-flows in the horizontal well bore and the inability to achieve zonal isolation in the well bore. These problems are solved by the methods of the present invention.

A method of this invention for reducing the permeability of one or more selected sections of a subterranean formation penetrated by a horizontal well bore and the flow of water or water and hydrocarbons or hydrocarbons therefrom comprises the following steps. An aqueous treating fluid comprising water and a water-soluble formation permeability reducing agent is prepared or provided. The water-soluble formation permeability reducing agent is selected from the group consisting of a hydrophobically modified water-soluble polymer, a hydrophilically modified water-soluble polymer and hydrophobically modified water-soluble polymer comprising polar heteroatoms within the polymer backbone. The aqueous treating fluid containing the water-soluble formation permeability reducing agent is introduced into the one or more selected sections so that the permeabilities and flows of water or water and hydrocarbons or hydrocarbons therefrom are reduced.

Another method of this invention for temporarily reducing the permeability of one or more selected sections of a subterranean formation penetrated by a horizontal well bore and the flow of water or water and hydrocarbons or hydrocarbons therefrom comprises the following steps. A first aqueous treating fluid comprising water and a water-soluble formation permeability reducing agent is prepared or provided. The water-soluble formation permeability reducing agent is selected from the group consisting of a hydrophobically modified water-soluble polymer, a hydrophilically modified water-soluble polymer and a hydrophobically modified water-soluble polymer comprising polar heteroatoms within the polymer backbone. The first aqueous treating fluid containing the water-soluble formation permeability reducing agent is introduced into the one or more selected sections so that the permeabilities and flows of water or water and hydrocarbons or hydrocarbons therefrom are reduced. Thereafter when required, the one or more selected sections are contacted with a second aqueous treating fluid comprising water and a formation permeability restoring chemical.

The water-soluble formation permeability reducing agents that can be utilized in accordance with this invention include hydrophobically modified water-soluble polymers, hydrophilically modified water-soluble polymers and hydrophobically modified water-soluble polymers comprising polar heteroatoms within the polymer backbones.

The hydrophobically modified water-soluble polymers useful in accordance with this invention can comprise the reaction product of a hydrophilic reactive polymer and a hydrophobic compound.

Hydrophilic reactive polymers suitable for use are preferably polymers containing reactive amino groups in the polymer backbone or as pendant groups. A more preferable such polymer contains dialkyl amino pendant groups. Most preferably, the polymer contains a dimethyl amino pendant group and contains at least one monomer selected from dimethylaminoethyl methacrylate or dimethylaminopropyl methacrylamide. Examples of such polymers include, but are not limited to, polyethyleneimine, polyvinylamine, poly(vinylamine/vinyl alcohol), chitosan, polylysine and alkyl acrylate polymers in general. Additional examples of alkyl acrylate hydrophilic reactive polymers include polydimethylaminoethyl methacrylate, polydimethylaminopropyl methacrylamide, poly(acrylamide/dimethylaminoethyl methacrylate), poly(acrylamide/dimethylaminopropyl methacrylamide), poly(acrylic acid/dimethylaminoethyl methacrylate). The most preferred polymers are polydimethylaminoethyl methacrylate and polydimethylaminopropyl methacrylamide.

Preferred hydrophobic compounds suitable for use in the present invention include, but are not limited to, alkyl halides. Preferably, the alkyl chain portion of the hydrophobic compound has from about 4 to about 30 carbon atoms. A particularly preferred hydrophobic compound is cetyl bromide.

Additional hydrophobically modified water-soluble polymers can be prepared from a variety of hydrophilic monomers and hydrophobically modified hydrophilic monomers. Examples of particularly suitable hydrophilic monomers that can be utilized include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropyl methacrylamide, vinyl amine, vinyl acetate, trimethylammoniumethyl methacrylate chloride, methacrylamide and hydroxyethyl acrylate. Of these, acrylamide, 2-acrylamido-2-methyl propane sulfonic acid, acrylic acid, dimethylaminoethyl methacrylate, dimethylaminopropyl methacrylamide and vinyl pyrrolidone are preferred.

Various hydrophobically modified hydrophilic monomers can be utilized to form the polymers of this invention. Particularly suitable hydrophobically modified hydrophilic monomers include, but are not limited to, alkyl acrylates, alkyl methacrylates, alkyl acrylamides and alkyl methacrylamides wherein the alkyl radicals have from about 4 to about 30 carbon atoms, alkyl dimethylammoniumethyl methacrylate bromide, alkyl dimethylammoniumethyl methacrylate chloride and alkyl dimethylammoniumethyl methacrylate iodide wherein the alkyl radicals have from 4 to about 30 carbon atoms and alkyl dimethylammoniumpropyl methacrylamide bromide, alkyl dimethylammoniumpropyl methacrylamide chloride and alkyl dimethylammoniumpropyl methacrylamide iodide wherein the alkyl groups have from about 4 to about 30 carbon atoms. Of these, octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate and hexadecyl methacrylamide are preferred.

The polymers that are useful in accordance with the present invention can be prepared by polymerizing any one or more of the hydrophilic monomers with any one or more of the hydrophobically modified hydrophilic monomers. Methods for preparing such polymers are known to those skilled in the art as represented by U.S. Pat. No. 6,476,169 issued to Eoff, et al. on Nov. 5, 2002 which is incorporated herein by reference thereto.

Suitable hydrophobically modified water-soluble polymers have estimated molecular weights in the range from about 100,000 to about 10,000,000 and have mole ratios of the hydrophilic monomers to the hydrophobically modified hydrophilic monomers in the range of from about 99.98:0.02 to about 90:10. Particularly suitable such polymers that have molecular weights and mole ratios in the ranges set forth above include, but are not limited to, acrylamide/octadecyldimethylammoniumethyl methacrylate bromide copolymer, dimethylaminoethyl methacrylate/hexadecyldimethylammoniumethyl methacrylate bromide copolymer, dimethylaminoethyl methacrylate/vinyl pyrrolidone/hexadecyldimethylammoniumethyl methacrylate bromide terpolymer and acrylamide/2-acrylamido-2-methyl propane sulfonic acid/2-ethylhexyl methacrylate terpolymer. Of these, a dimethylaminoethyl methacrylate/hexadecyldimethylammoniumethyl methacrylate bromide copolymer having a mole ratio of hydrophilic monomer to hydrophobically modified hydrophilic monomer of 95:5 is a preferred hydrophobically modified water-soluble polymer.

When used, the hydrophobically modified water-soluble polymers are present in the first aqueous treating fluid in an amount in the range of from about 0.01% to about 10% by weight of the first aqueous treating fluid.

The hydrophilically modified water-soluble polymers useful in accordance with the methods of this invention are the reaction products of a hydrophilic reactive polymer and a hydrophilic compound. Hydrophilic reactive polymers suitable for use in the aqueous solutions of the current invention are preferably polymers containing reactive amino groups in the polymer backbone or as pendant groups. A more preferable polymer contains dialky amino pendant groups. Most preferably the polymer contains a dimethyl amino pendant group and contains at least one monomer selected from dimethylaminoethyl methacrylate or dimethylaminopropyl methacrylamide. Examples of such polymers include, but are not limited to, polyethyleneimine, polyvinylamine, poly(vinylamine/vinyl alcohol), chitosan, polylysine and alkyl acrylate polymers in general. Additional examples of alkyl acrylate polymers include, polydimethylaminoethyl methacrylate, polydimethylaminopropyl methacrylamide, poly(acrylamide/dimethylaminoethyl methacrylate), poly(acrylamide/dimethylaminopropyl methacrylamide) and poly(acrylic acid/dimethylaminoethyl methacrylate). The most preferred polymers are polydimethylaminoethyl methacrylate and polydimethylaminopropyl methacrylamide.

Additional polymers useful in forming hydrophilically modified water-soluble polymers are preferably prepared from a variety of hydrophilic monomers copolymerized with monomers containing reactive amino groups. Examples of particularly suitable hydrophilic monomers which can be utilized include, but are not limited to, acrylamide, 2-acrylamido-2-methyl propane sulfonic acid, N,N-dimethylacrylamide, vinyl pyrrolidone, acrylic acid, vinyl acetate, trimethylammoniumethyl methacrylate chloride, methacrylamide and hydroxyethyl acrylate. Of these, acrylamide, 2-acrylamido-2-methyl propane sulfonic acid, acrylic acid, and vinyl pyrrolidone are preferred.

The hydrophilic compounds suitable for reaction with the hydrophilic reactive polymers include halogen containing polyalkoxides. Examples of such polyalkoxides include polyethylene glycol, polypropylene glycol, polybutylene glycol, and mixtures thereof. The preferred halogen containing polyalkoxide is an epichlorohydrin terminated polyethylene glycol methyl ether.

Suitable hydrophilically modified water-soluble polymers have estimated molecular weights in the range of from about 100,000 to about 10,000,000 and have weight ratios of the hydrophilic polymer to the halogen containing polyalkoxides in the range of from about 1:1 to about 10:1. Particularly suitable polymers having molecular weights and mole ratios in the ranges set forth above include, but are not limited to, the reaction product of polydimethylaminoethyl methacrylate with epichlorohydrin terminated polyethylene glycol methyl ether, the reaction product of poly(dimethylaminoethyl methacrylate/acrylamide) with epichlorohydrin terminated polyethylene glycol methyl ether, the reaction product of polydimethylaminopropyl methacrylamide with epichlorohydrin terminated polyethylene glycol methyl ether, and the reaction product of poly(dimethylaminopropyl methacrylamide/acrylamide) with epichlorohydrin terminated polyethylene glycol methyl ether. Of these, a polydimethylaminoethyl methacrylate epichlorohydrin terminated polyethylene glycol methyl ether reaction product having a mole ratio of polydimethylaminoethyl methacrylate to epichlorohydrin terminated polyethylene glycol methyl ether of 3:1 is preferred.

When used, the hydrophilically modified water-soluble polymers are present in the first aqueous treating fluid in an amount in the range of from about 0.01% to about 10% by weight of the first aqueous treating fluid.

The hydrophobically modified water-soluble polymers comprising polar heteroatoms within the polymer backbone are the reaction products of hydrophilic polymers comprising polar heteroatoms within the polymer backbones and hydrophobic compounds such as hydrophobic alkyl halide compounds. The polymers may also comprise at least one reactive amino group in the polymer. Suitable polymers include homopolymers, copolymers or terpolymers including, but not limited to, water-soluble polysaccharides such as cellulose, starch, polyetheramines, polyhydroxyetheramines, polyamides and polysulfones. For example, a suitable water-soluble polysaccharide is formed by reacting a starch, such as corn, maize, waxy maize, potato, tapioca, and the like with the reaction product of epichlorohydrin and trialkylamine.

The polar heteroatoms in the hydrophobically modified water-soluble polymers comprising heteroatoms in the polymer backbone can be one or more of oxygen, nitrogen, sulfur and phosphorous.

The hydrophobic compounds that are capable of reacting with the hydrophilic reactive polymers comprising polar heteroatoms within the polymer backbone include, but are not limited to, alkyl halides, sulfonates, sulfates, and organic acid derivatives. Examples of suitable organic acid derivatives include, but are not limited to, octenyl succinic acid, dodecenyl succinic acid and anhydrides, esters and amides of octenyl succinic acid or dodecenyl succinic acid. In certain exemplary embodiments, the hydrophobic compounds may have an alkyl chain length of about 4 to about 30 carbon atoms. A preferred hydrophobic compound is cetyl bromide.

The reaction of the hydrophilic reactive polymer comprising polar heteroatoms and the hydrophobic compound yields the hydrophobically modified water-soluble polymer. When the hydrophobic compound is an alkyl halide, the term "hydrophobically modified" includes the quaternization of at least some of the hydrophilic reactive polymer amino groups with the alkyl halide, the alkyl chain length being from about 4 to about 30 carbon atoms. Typically, the hydrophobically modified polymer has a molecular weight in the range of from about 100,000 to about 10,000,000.

When used, the hydrophilically modified water-soluble polymers comprising polar heteroatoms within the polymer backbones are present in the first aqueous treating fluid in an amount in the range of from about 0.1% to about 10% by weight of the first aqueous treating fluid.

The components of the water-soluble formation permeability reducing agents of this invention can be pre-reacted and combined with the first aqueous treating fluid or they can be combined with the first aqueous treating fluid and reacted in-situ. When the water-soluble formation permeability reducing agents are reacted in-situ, a shut-in period of several minutes to several hours may be required for the reaction to take place. Generally, the down-hole temperature determines the length of the shut-in period required.

As will be understood by those skilled in the art, the first treating fluid can include various additional components such as gelling agents, surfactants, pH adjusting agents and the like.

As mentioned above, when it is required to restore the permeability of the one or more selected sections in which the permeability and the flow of water or water and hydrocarbons therefrom have been reduced in accordance with this invention, a formation permeability restoring chemical is combined with a second aqueous treating fluid and the second aqueous treating fluid is introduced into the one or more selected sections whereby the permeabilities thereof are restored. The permeability restoring chemicals that can be utilized include, but are not limited to, alkali, alkaline earth and transition metal salts of periodate, hypochlorite, perbromite, chlorite, chlorate, hydrogen peroxide, peracetic acid, soluble peroxide salts, persulfate salts, percarboxylate acids, oxyhalo acids and mixtures thereof. The preferred permeability restoring chemical for use in accordance with this invention is sodium hypochlorite. The permeability restoring chemical is generally added to the second aqueous treating fluid in an amount in the range of from about 1% to about 25% by weight of the second aqueous treating fluid.

A preferred method of this invention for reducing the permeability of one or more selected sections of a subterranean formation penetrated by a horizontal well bore and the flow of water or water and hydrocarbons or hydrocarbons therefrom comprises the steps of: (a) preparing or providing an aqueous treating fluid comprising water and a water-soluble formation permeability reducing agent selected from the group consisting of a hydrophobically modified water-soluble polymer, a hydrophilically modified water-soluble polymer and a hydrophobically modified water-soluble polymer comprising polar heteroatoms within the polymer backbone; and (b) introducing the aqueous treating fluid containing the water-soluble formation permeability reducing agent into the one or more selected sections so that the permeabilities and flows of water or water and hydrocarbons or hydrocarbons therefrom are reduced.

Another preferred method of this invention for temporarily reducing the permeability of one or more selected sections of a subterranean formation penetrated by a horizontal well bore and the flow of water or water and hydrocarbons or hydrocarbons therefrom and restoring the permeability and flow when required comprises the steps of: (a) preparing or providing a first aqueous treating fluid comprising water and a water-soluble formation permeability reducing agent selected from the group consisting of a hydrophobically modified water-soluble polymer, a hydrophilically modified water-soluble polymer and a hydrophobically modified water-soluble polymer comprising polar heteroatoms within the polymer backbone; (b) introducing the first aqueous treating fluid containing the water-soluble formation permeability reducing agent into the one or more selected sections so that the permeabilities and flows of water or water and hydrocarbons or hydrocarbons therefrom are reduced; and (c) when required, contacting said one or more selected sections with a second aqueous treating fluid comprising water and a formation permeability restoring chemical.

In order to further illustrate the methods of the present invention, the following example is given.

EXAMPLE

A multi-pressure tap Hassler sleeve containing a sandstone core was utilized to determine the water permeability reduction produced by a copolymer of dimethylaminoethyl methacrylate/hexadecyldimethylammoniumethyl methacrylate bromide. The same core was utilized to determine the ability to restore the permeability of the core using sodium hypochlorite. The tests were run at a temperature of 200° F. utilizing a brine containing 9% by weight sodium chloride and 1% by weight calcium chloride. The following procedure was used for this series of tests, the results of which are provided in Table I. The above-described brine was flowed through the core, followed by oil (kerosene), followed by brine. This third brine flow was maintained until the pressure stabilized, yielding an initial brine permeability. Next, a 6000 ppm polymer treatment solution was flowed into the core. Next, the brine flow was reestablished until the pressure stabilized, yielding a final permeability from which the brine permeability % reduction was calculated using the formula [1-(final permeability/initial permeability)]×100.

The multi-pressure tap Hassler sleeve allowed the core permeability to be divided into four segments. In the tests, the initial brine flow was from segment 1 to segment 4. The treatment solution flow was from segment 4 to segment 1, and the final brine flow was from segment 1 to segment 4. Data is presented for segments 2 and 3 only, which show that the polymer did penetrate into the core and did not simply plug off as it entered the core at segment 4. The results of the tests are provided below in Table I. As shown, the polymer was very effective in reducing the permeability of the core to brine.

Next, a solution containing 5% sodium hypochlorite and 1.8% sodium hydroxide was flowed into the core, and the core was shut in overnight. The next day brine flow was reestablished until the pressure stabilized, and the brine permeability % reduction was again calculated. As shown in Table I, the sodium hypochlorite almost totally restored the original permeability of the core, illustrating that the effect of the polymer treatment can be removed.

TABLE I

| Treatment Concentration (ppm) | Initial Permeability (md) | Treatment Volume (ml) | Total Reduction (%) | Segment 2 Reduction (%) | Segment 3 Reduction (%) |
|---|---|---|---|---|---|
| 6,000 polymer solution | 875 (Sor) | 500 | 85 | 85 | 85 |
| 5% NaOCl + 1.8% NaOH | 875 (Sor) | 25 | 2 | −25 | −20 |

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of reducing the permeability of one or more selected sections of a subterranean formation penetrated of a horizontal well bore and the flow of water or water and hydrocarbons or hydrocarbons therefrom comprising the steps of:
   (a) preparing or providing an aqueous treating fluid comprising water and a water-soluble formation permeability reducing agent, wherein the water-soluble formation permeability reducing agent is a hydrophobically modified water-soluble polymer present in the aqueous treating fluid in an amount in the range of from about 0.1% to about 10% by weight of the aqueous treating fluid, wherein the hydrophobically modified water-soluble polymer is a reaction product of a hydrophilic monomer and a hydrophobically modified hydrophilic monomer, and wherein the hydrophobically modified water-soluble polymer comprises a dimethylaminoethyl methacrylat/hexadecyldimethylammoniumethyl methacrylate bromide copolymer having a mole ratio of hydrophilic monomer to hydrophobically modified hydropbilic monomer of 95:5; and
   (b) introducing the aqueous treating fluid containing the water-soluble formation permeability reducing agent into the one or more selected sections of the subterranean formation closest to the heel of the horizontal wellbore so that the permeabilities and flows of water or water and hydrocarbons or hydrocarbons therefrom are reduced.

2. The method of claim 1 wherein the hydrophobically modified water-soluble polymer has a molecular weight in the range of from about 100,000 to about 10,000,000.

3. The method of claim 1 wherein the aqueous treating fluid further comprises a gelling agent.

4. The method according to claim 1, further comprising the step of:
when required, contacting said one or more selected sections with a second aqueous treating fluid comprising water and a formation permeability restoring chemical.

5. The method of claim 4 wherein the formation permeability restoring chemical in the second aqueous treating fluid is selected from the group consisting of alkali, alkaline earth and transition metal salts of periodate, hypochlorite, perbromate, chlorite, chlorate, hydrogen peroxide, peracetic acid, soluble peroxide salts, persulfate salts, percarboxylate acids, oxyhalo acids and mixtures thereof.

6. The method of claim 5 wherein the permeability restoring chemical is sodium hypochlorite.

7. The method of claim 5 wherein the permeability restoring chemical is present in the second aqueous treating fluid in an amount in the range of from about 1% to about 25% by weight of the second aqueous treating fluid.

8. A method of reducing the permeability of one or more selected sections of a subterranean formation penetrated of a horizontal well bore and the flow of water or water and hydrocarbons or hydrocarbons therefrom comprising the steps of:
(a) preparing or providing an aqueous treating fluid comprising water and a water-soluble formation permeability reducing agent, wherein the water-soluble formation permeability reducing agent is a hydrophobically modified water-soluble polymer present in the aqueous treating fluid in an amount in the range of from about 0.1% to about 10% by weight of the aqueous treating fluid, wherein the hydrophobically modified water-soluble polymer is a reaction product of a hydrophilic reactive polymer and a hydrophilic modified hydrophilic compound, wherein the hydrophilic compound is selected from the group consisting of halogen containing polyethers, and wherein the halogen containing polyether comprises an epichlorohydrin terminated polyether glycol methyl ether; and
(b) introducing the aqueous treating fluid containing the water-soluble formation permeability reducing agent into the one or more selected sections of the subterranean formation closest to the heel of the horizontal wellbore so that the permeabilities and flows of water or water and hydrocarbons or hydrocarbons therefrom are reduced.

9. A method of reducing the permeability of one or more selected sections of a subterranean formation penetrated of a horizontal well bore and the flow of water or water and hydrocarbons or hydrocarbons therefrom comprising the steps of:
(a) preparing or providing an aqueous treating fluid comprising water and a water-soluble formation permeability reducing agent, wherein the water-soluble formation permeability reducing agent is a hydrophilically modified water-soluble present in the aqueous treating fluid in an amount in the range of from about 0.1% to about 10% by weight of the aqueous treating fluid, wherein the hydrophilically modified water-soluble polymer is a reaction product of a hydrophilic reactive polymer and a hydrophilic compound, wherein the hydrophilic compound is selected from the group consisting of halogen containing polyethers, and wherein the weight ratio of the hydrophilic reactive polymer to the halogen containing polyether is in the range of from about 1:1 to about 10:1; and
(a) introducing the aqueous treating fluid containing water-soluble formation permeability reducing agent into the one or more selected sections of the subterranean formation closest to the heal of the horizontal wellbore so that the permeabilities and flows of water or water and hydrocarbon or hydrocarbons therefrom are reduced.

10. The method of claim 9 wherein the hydrophilic reactive polymer comprises a reactive amino group.

11. The method of claim 9 wherein the hydrophilic reactive polymer is a product of a polymerization reaction in which at least one monomer is selected from the group consisting of dimethylaminoethyl methacrylate and dimethylaminopropyl methacrylamide.

12. The method of claim 9 wherein the hydrophilic reactive polymer is selected from the group consisting of polyethyleneimine, polyvinylamine, poly(vinylamine/vinyl alcohol), chitosan and polylysine.

13. The method of claim 9 wherein the hydrophilic reactive polymer comprises an alkyl acrylate polymer.

14. The method of claim 13 wherein the alkyl acrylate polymer is selected from the group consisting of polydimethylaminoethyl methacrylate, polydimethylaminopropyl methacrylamide, poly(acrylamide/dimethylaminoethyl methacrylate), poly(acrylamide/dimethylaminopropyl methacrylamide) and poly(acrylic acid/dimethylaminoethyl methacrylate).

15. The method of claim 9 wherein the hydrophilic reactive polymer is a reaction product of a hydrophilic monomer copolymerized with monomers containing reactive amino groups.

16. The method claim 15 wherein the hydrophilic monomer is selected from the group consisting of acrylamide, 2-acrylamido-2-methyl propane sulfonic acid, N,N-dimethylacrylamide, vinyl pyrrolidone, acrylic acid, trimethylammoniumethyl methacrylate chloride, methacrylamide and bydroxyethyl acrylate.

17. The method of claim 9 wherein the hydrophilically modified water-soluble polymer comprises a polymer having a molecular weight in the range of from about 100,000 to about 10,000,000.

18. The method of claim 9 wherein the hydrophilic reactive polymer is chitosan.

19. A method of reducing the permeability of one or more selected sections of a subterranean formation penetrated of a horizontal well bore and the flow of water or water and hydrocarbons or hydrocarbons therefrom comprising the steps of:
(a) preparing or providing an aqueous treating fluid comprising water and a water-soluble formation permeability reducing agent, wherein the water-soluble formation permeabillty reducing agent is a hydrophilically modified water-soluble present in the aqueous treating fluid in an amount in the range of from about 0.1% to about 10% by weight of the aqueous treating fluid, wherein the hydrophilically modified water-soluble polymer is a reaction product of a hydrophilic reactive polymer and hydrophilic compound, and wherein the hydrophilically modified water-soluble polymer is selected from the group consisting of the reaction product of polydimethylaminoethyl methacrylate with epichlorohydrin terminated polyethylene glycol methyl ether, the reaction product of poly(acrylamide/dimethylaminoethyl methacrylate) with epichlorohydrin terminated polyethylene glycol methyl ether, the reaction product of polydimethylaminopropyl methacrylamide with epichlorohydrin terminated polyethylene glycol methyl ether, and the reaction product of poly(acrylamide/dimethylaminopropyl methacrylamide) with epichlorohydrin terminated polyethylene glycol methyl ether; and (b) introducing the aqueous treating fluid containing the water-soluble formation permeability reducing agent into the one or more selected sections of the subterranean formation closest to the heel of the horizontal wellbore so that the permeabilities and flows of water or water and hydrocarbons or hydrocarbons therefrom are reduced.

* * * * *